United States Patent
Hu et al.

(10) Patent No.: US 7,125,606 B2
(45) Date of Patent: *Oct. 24, 2006

(54) CARBOXYLIC ACID MODIFIED AMINOPLAST CROSSLINKERS AND POWDER COATING COMPOSITIONS CONTAINING SUCH CROSSLINKERS

(75) Inventors: Shengkui Hu, Baden, PA (US); Anthony M. Chasser, Allison Park, PA (US); Jackie L. Kulfan, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 169 days.

This patent is subject to a terminal disclaimer.

(21) Appl. No.: 10/231,634

(22) Filed: Aug. 30, 2002

(65) Prior Publication Data

US 2004/0043223 A1    Mar. 4, 2004

(51) Int. Cl.
*B32B 27/38* (2006.01)
*B32B 27/26* (2006.01)
*C08L 63/00* (2006.01)
*C08L 61/00* (2006.01)
*C08G 73/00* (2006.01)

(52) U.S. Cl. ............ 428/413; 428/423.1; 428/480; 428/500; 525/510; 525/519; 525/533; 528/363

(58) Field of Classification Search ............ 525/403, 525/406, 418, 934; 428/413, 418, 423.1, 428/480, 523

See application file for complete search history.

(56) References Cited

U.S. PATENT DOCUMENTS

| | | | |
|---|---|---|---|
| 3,759,854 A | 9/1973 | Chang et al. | 260/21 |
| 3,922,447 A | 11/1975 | Isaksen et al. | 428/474 |
| 3,980,732 A | 9/1976 | Isaksen et al. | 260/850 |
| 3,980,733 A | 9/1976 | Isaksen et al. | 260/850 |
| 4,026,855 A * | 5/1977 | Parekh et al. | 524/512 |
| 4,102,943 A | 7/1978 | Isaksen et al. | 260/850 |
| 4,133,843 A | 1/1979 | Isaksen et al. | 260/850 |
| 4,151,220 A | 4/1979 | Watanabe et al. | 260/850 |
| 4,190,714 A | 2/1980 | Isaksen et al. | 525/163 |
| 4,190,715 A | 2/1980 | Isaksen et al. | 525/163 |
| 4,217,377 A * | 8/1980 | Shay et al. | 427/195 |
| 4,230,829 A | 10/1980 | Yoshihara et al. | 525/162 |
| 5,302,462 A | 4/1994 | Shah et al. | 428/482 |
| 6,613,436 B1 * | 9/2003 | Ambrose et al. | 428/413 |
| 6,624,249 B1 * | 9/2003 | Ambrose et al. | 525/159 |

FOREIGN PATENT DOCUMENTS

| | | |
|---|---|---|
| DE | 197 31 352 | 3/1988 |
| FR | 890760 | 2/1944 |
| GB | 1 186 575 | 4/1970 |
| GB | 1 353 888 | 5/1974 |

OTHER PUBLICATIONS

Copending U.S. Appl. No. 10/844,282.*

* cited by examiner

*Primary Examiner*—Michael J. Feely
(74) *Attorney, Agent, or Firm*—Diane R. Meyers

(57) ABSTRACT

A crosslinking agent that is an ungelled reaction product of (a) an aminoplast resin and (b) a carboxylic acid-containing compound wherein the crosslinking agent is essentially free of reactive carboxylic acid groups and has a glass transition temperature of at least 10° C. is disclosed. Methods for preparing crosslinking agents are also disclosed. Further provided is a curable powder coating composition including a polymer having a glass transition temperature of at least 30° C. containing reactive functional groups and the present crosslinking agent; a multilayer composite coating composition and substrates coated therewith are also disclosed.

27 Claims, No Drawings

CARBOXYLIC ACID MODIFIED AMINOPLAST CROSSLINKERS AND POWDER COATING COMPOSITIONS CONTAINING SUCH CROSSLINKERS

FIELD OF THE INVENTION

The present invention relates to crosslinking agents based on modified aminoplast resins and to powder coating compositions containing these crosslinking agents.

BACKGROUND OF THE INVENTION

In recent years, powder coatings have become increasingly popular because these coatings are inherently low in volatile organic content ("VOC"). The low VOC significantly reduces air emissions into the atmosphere during application and curing as compared to liquid coatings.

Hydroxyl, carboxyl, carbamate, and/or epoxy functional resins, such as acrylic and polyester resins having relatively high glass transition temperatures ("Tg"), are commonly used as the main film-forming polymers for powder coatings. The relatively high Tg of such polymers provides powder coatings having good storage stability. When exposed to the extreme temperatures both during shipping and/or storage, however, even better powder coating stability is desired. By "stability" or "storage stability" is meant the ability of the individual powder particles that comprise the powder coating to resist the tendency to adhere to one another, which causes "clumping" or "fusing" of the powder coating composition. Powder coating compositions having very poor storage stability can be difficult, if not impossible, to apply.

Aminoplast resins are well known in the art as low cost crosslinking agents for hydroxyl, carboxyl, and/or carbamate functional polymers in conventional liquid coating compositions. Aminoplast resins can impart enhanced properties to the coatings, such as exterior durability, chemical resistance, and mar resistance. Attempts to produce powder coating compositions based on conventional aminoplast resins that provide these desirable properties often give unsatisfactory results because these materials are typically in liquid form. In addition to problems with incorporating the liquid aminoplast into the powder coating, their incorporation, when successful, can result in a coating having poor powder stability.

Methoxylated aldehyde condensates of glycoluril, which are solid aminoplast resins, are employed as crosslinking agents in powder coating compositions. Although solid in form, these materials can still depress the Tg of the powder coating composition significantly, even when combined with high Tg film-forming polymers such as the acrylic polymers discussed above. A depression in Tg can also result in poor powder stability.

Moreover, the use of conventional aminoplast resins in powder coating compositions can result in the phenomenon commonly referred to as "gassing". Gassing can occur as a result of vaporization of the alcohol generated in the thermally induced aminoplast crosslinking reaction. The alcohol vapor is driven off through the coating film upon heating; as the viscosity of the coating increases during the curing process, "pinholes" or "craters" are formed as the gas escapes through the coating surface.

Thus, there is a need in the art for improved aminoplast crosslinkers that can be used with powder coatings.

SUMMARY OF THE INVENTION

The present invention is directed to a crosslinking agent comprising the ungelled reaction product of (a) at least one aminoplast resin; and (b) at least one carboxylic acid-containing compound. A method for preparing such a crosslinking agent is also disclosed.

As discussed above, the incorporation of aminoplast resins into powder coatings has been difficult to achieve. The present invention overcomes these difficulties by providing modified aminoplasts that are in solid, ungelled form. An "ungelled" product is one that has a measurable intrinsic viscosity when dissolved in a suitable solvent; a gelled product, in contrast, is one whose intrinsic viscosity when dissolved in a solvent is too high to measure. In addition, an ungelled product can be melted, solidified, and remelted. The ungelled products of the present invention can therefore be incorporated into powder coatings and processed according to methods standard in the art. Significantly, powder coatings containing the present modified aminoplasts give good performance, have good stability and are easy to use.

DETAILED DESCRIPTION OF THE INVENTION

The present invention is directed a crosslinking agent comprising an ungelled reaction product of (a) an aminoplast resin and (b) a carboxylic acid-containing compound. The crosslinking agent is substantially free of functional groups that are reactive with an aminoplast resin, and has a Tg of at least 10° C.

Aminoplast resins are based on the condensation product of an aldehyde with an amino- or amido-group containing compound. While the aldehyde employed is most often formaldehyde, other aldehydes such as acetaldehyde, crotonaldehyde, acrolein, benzaldehyde, furfural, and glyoxal can also be used. Amine/amide containing compounds include those derived from at least one of glycoluril, aminotriazine, or benzoguanamine. Such compounds include, for example, alkoxyalkyl derivatives of melamine, glycoluril, benzoguanamine, acetoguanamine, formoguanamine, spiroguanamine, and the like. Condensation products obtained from the reaction of alcohols and formaldehyde with melamine, urea or benzoguanamine are most common and most suitable for use in the present invention. Condensation products of other amines and amides can also be employed, for example, aldehyde condensates of triazines, diazines, triazoles, guanadines, guanamines, and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, and 3,4,6-tris(ethylamino)-1,3,5 triazine.

Aminoplast resins typically contain methylol or other alkylol groups and, in most instances, at least a portion of these alkylol groups are etherified by a reaction with an alcohol. Any monohydric alcohol can be employed for this purpose, including such alcohols as methanol, ethanol, propanol, butanol, pentanol, hexanol, cyclohexanol, heptanol, and others, as well as benzyl alcohol, and other aromatic alcohols, cyclic alcohols such as cyclohexanol, monoethers of glycols, and halogen-substituted or other substituted alcohols, such as 3-chloropropanol and butoxyethanol. Aminoplast resins that are substantially alkylated with methanol or butanol are particularly suitable for use herein.

Nonlimiting examples of suitable aminotriazine compounds suitable for use in the present invention include alkoxyalkyl aminotriazines, such as (methoxymethyl) melamine-formaldehyde resin, for example CYMEL 300, CYMEL 303, RESIMENE 745, and RESIMENE 757; ethylated-methylated benzoguanamine-formaldehyde resin, for example CYMEL 1123; and methylated-butylated melamine-formaldehyde resin, for example CYMEL 1135, CYMEL 1133, and CYMEL 1168. These products are commercially available from either Cytec Industries, Inc. or Solutia, Inc.

In another embodiment of the present invention, the aminoplast resin (a) comprises a compound derived from glycoluril, such as alkoxylated aldehyde condensates of glycoluril. The alkoxylated aldehyde condensates of glycoluril suitable for use as the aminoplast resin (a) can be prepared by reacting glycoluril, or acetylene diurea, with an aldehyde, typically formaldehyde, to form tetra-alkylol glycoluril. In this embodiment, the alkylol groups are usually etherified with a mono-alcohol, such as a $C_1$ to $C_6$ monoalcohol, to form tetra-alkoxy alkyl glycoluril. An example of such a tetra-alkoxyalkyl glycoluril is tetra-methoxy methyl glycoluril, which is commercially available as POWDERLINK 1174 from Cytec Industries, Inc.

In addition to the aminoplast resin (a), the reactants used to form the crosslinking agent of the present invention further comprise (b) at least one carboxylic acid-containing compound. A "carboxylic acid-containing compound" refers to any compound that has at least one carboxylic acid functional group. A number of carboxylic acids can be used according to the present invention, provided they are of the appropriate acidity. Generally, carboxylic acids having a pKa of >3, such as >4, are suitable. "pKa" values reported herein refer to pKa as measured in deionized water at 25° C. "pKa" will be understood as a means for expressing the strength of acids; the weaker the acid, the larger the pKa. If the pKa of the carboxylic acid-containing compound is below about 3, the acid will catalyze the self-condensation of the aminoplast resin; this will result in a gelled rather than an ungelled reaction product. Similarly, the use of a polycarboxylic acid alone can result in a gelled product. Thus, the carboxylic acid-containing compound used in the present invention is most suitably a monofunctional acid, or a mixture of monofunctional and polyfunctional acids. If such an acid mixture is used, the polyfunctional acid should typically comprise ≦20 percent of the mixture. Aromatic carboxylic acids, such as benzoic acid and its derivatives, are particularly suitable; derivatives of benzoic acid include those materials having substitutions on the phenyl ring of the benzoic acid molecule; examples include toluic acids, anisic acid, and 4-tert-butylbenzoic acid. Aromatic group-containing alkyl carboxylic acids such as cinnamic acid and phenyl acetic acid and its derivatives are also suitable; derivatives of these acids include compounds where the phenyl ring of the acid is substituted. Other suitable monofunctional carboxylic acids include, but are not limited to, hexahydrobenzoic acid, diphenyl acetic acid and those known to one skilled in the art. Polycarboxylic acids suitable for use with one or more monofunctional carboxylic acids include, for example, phthalic acid, terephthalic acid, and trimellitic acid.

The present crosslinkers can be prepared by further reaction with compound (c), a mono-hydroxy aromatic compound having structure (I):

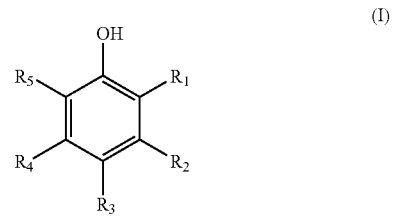

wherein each of $R_1$ through $R_5$ are the same or different and are selected from H, a monovalent hydrocarbon group, $COOR_6$ where $R_6$ is H or a monovalent hydrocarbon group, $NO_2$, halogen or $XR_7$, where X is oxygen or sulfur and $R_7$ is a monovalent hydrocarbon group having 1 to 8 carbon atoms. A monovalent hydrocarbon group is an organic group-containing carbon and hydrogen. The hydrocarbon groups may be aliphatic or aromatic, and may contain from 1 to 24 (in the case of aromatic from 3 to 24) carbon atoms. A "monovalent hydrocarbon group" can also be a heteroatomic hydrocarbon group; that is, one or more of the carbon molecules in the group can be substituted with heteroatoms, typically oxygen or nitrogen. Nonlimiting examples of such monovalent hydrogen groups include alkyl, alkoxy, aryl, alkylaryl and alkoxyaryl groups. Particularly suitable compounds within structure I include phenol and t-butyl phenol. Particularly suitable combinations of compound (b) and compound (c) include p-toluic acid, p-tert butyl benzoic acid and benzoic acid or trans-cinnamic acid with t-butyl phenol.

The present crosslinkers can be prepared, either in addition to or instead of compound (c), with compound (d), which comprises compounds having the following structure (II):

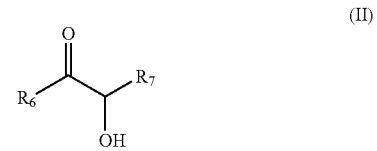

or dimer derivatives thereof as discussed below, where $R_6$ and $R_7$ are the same or different and each independently represents an aromatic group having 4 to 20 carbons or an alkyl group having 1 to 12 carbon atoms. In a specific embodiment of the present invention, one or both of the substituent groups $R_6$ and $R_7$ are aromatic groups, for example phenyl, naphthyl, methoxy phenyl, or dimethylaminophenyl groups. Suitable aromatic groups can also contain one or more heteroatoms, such as O, N, and S, either internal or external to the aromatic ring. The heteroatoms external to the ring may be attached directly to the ring or indirectly through one or more carbon atoms. One or more heteroatoms may be present in each such substituent and one or more substituents may be attached to the aromatic ring. The heteroatom containing substituent group(s) may be attached to the aromatic ring in any position or combination of positions on the ring. Suitable heteroatomic substituent groups include but are not limited to amines, ethers, esters, ketones, amides, halides, sulfonamides, nitro and carboxylic acid groups. Heteroatoms internal to the aromatic ring may be present in any position or combination of positions. For example, such heteroaromatic groups can include but are not limited to furans, pyridines, thiophenes, triazines, imidazoles, oxazoles, thiazoles, pyrazoles and triazoles. Non-limiting examples of such compounds include anisoin, pyridoin, furoin, bufyroin.

Compounds having the general structure (II) above are known to form dimeric derivatives, particularly when $R^6$ and $R^7$ are alkyl.

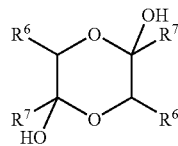

(III)

Such dimer derivatives can have the structure (III) above where $R^6$ and $R^7$ are as described above for the structure (II).

The carboxylic acid-containing compound (b) can comprise one or more mono or polyfunctional acids. Inclusion of the carboxylic acid-containing compound (b) as a reactant in the preparation of the crosslinking agent of the present invention can provide several advantages. First, reaction of the carboxylic acid-containing compound (b) with the aminoplast resin (a) can generally increase the Tg of the resultant crosslinker, as compared to an analogous crosslinking agent having no such modification. Also, use of compound (b) as described above can allow for the reaction of more alkoxy groups of the aminoplast resin without resulting in a gelled reaction product. Such a crosslinking agent, when incorporated into curable powder coating compositions, can cause less gassing upon curing than an unmodified aminoplast resin. Furthermore, when crosslinking agents of the present invention are used in curable powder coating compositions, the degassing agent may be released in situ. This can reduce adverse effects, for example, yellowing of the film, which can be caused by the presence of separately added degassing agents during curing processes.

The aminoplast resin (a) generally constitutes 90 weight percent or less, often 85 weight percent or less, and typically 80 weight percent or less of the reaction mixture, based on the total combined weight of reactants (a) and (b). Also, the aminoplast resin (a) generally constitutes at least 25 weight percent, often at least 35 weight percent, and typically at least 45 weight percent of the reaction mixture, based on the total combined weight reactants (a) and (b). The percent by weight of the aminoplast resin (a) present in the reaction mixture can range between any combination of these values inclusive of the recited values.

The carboxylic acid-containing compound (b) generally constitutes 75 weight percent or less, often 65 weight percent or less, and typically 55 weight percent or less of the reaction mixture, based on the total combined weight of reactants (a) and (b). Also, the carboxylic acid-containing compound (b) generally constitutes at least 10 weight percent, often at least 15 weight percent, and typically at least 20 weight percent of the reaction mixture, based on the total combined weight of reactants (a) and (b). The percent by weight of the carboxylic acid-containing compound (b) present in the reaction mixture can range between any combination of these values inclusive of the recited values.

If compound (c) and/or compound (d) are used, they generally constitute 15 weight percent or less, often 10 weight percent or less, and typically 5 weight percent or less of the reaction mixture, based on the total combined weight of reactants (a), (b), (c) and/or (d). Also, compounds (c) and/or (d) generally constitutes at least 1 weight percent, often at least 2 weight percent, and typically at least 3 weight percent of the reaction mixture, based on the total combined weight of reactants (a) and (b). The percent by weight of compounds (c) and/or (d) present in the reaction mixture can range between any combination of these values inclusive of the recited values.

The crosslinking agent of the present invention generally has a Tg of at least 10° C., often at least 15° C., usually at least 20° C., and typically at least 25° C. Also, the crosslinking agent generally has a Tg of less than 85° C., often less than 80° C., usually less than 75° C., and typically less than 70° C. The Tg of the crosslinking agent can range between any combination of these values, inclusive of the recited values.

The Tg can be measured experimentally using differential scanning calorimetry (rate of heating 10° C. per minute, Tg taken at the first inflection point). Unless otherwise indicated, the stated Tg as used herein refers to the measured Tg.

The present invention is also directed to a method for preparing the present crosslinking agents. More specifically, the aminoplast resin (a) and the carboxylic acid-compound (b) are combined in a suitably equipped reaction vessel, typically with an appropriate strong acid as catalyst and optionally a suitable solvent. Any suitable solvent can be used, with aromatic solvents being most often employed. Examples of suitable aromatic solvents include xylene, toluene, and mixtures of these solvents. Examples of strong acids suitable for use as a catalyst include, but are not limited to, para-toluene sulfonic acid, dodecyl benzene sulfonic acid, and dodecyl benzene disulfonic acid. Normal condensation techniques well known in the art can be used. The reaction admixture is heated to a temperature ranging from 90° C. to 160° C., usually from 100° C. to 140° C., and held at that temperature for a period sufficient to obtain an ungelled product having a Tg of at least 10° C. The reaction is terminated when the reaction end point (e.g., the disappearance of the OH signal in infrared spectra and the disappearance of the carboxylic acid functionality as measured by the acid number) is detected by appropriate analytical methods.

In the preparation of the crosslinking agent of the present invention, the aminoplast resin (a) and the carboxylic acid-containing compound (b) are combined in a ratio such that the resulting reaction product is substantially free of active hydrogen-containing groups, specifically carboxylic acid groups, hydroxy groups, or any other groups containing active hydrogens. Any ratio of a) to b) that allows this result to be achieved is within the present invention. It has been found that particularly good crosslinkers (such as those having a Tg >25° C.) are formed when the molar ratio of (a) and (b) is 1 to greater than 1.5. A specific embodiment of the present invention uses benzoic acid as compound (b) in a molar ratio of greater than 1.5 moles benzoic acid per mole of aminoplast. The reaction is monitored for the disappearance of carboxylic acid functionality via acidity measurements and is generally terminated when the product contains acid equivalent to <15 mg KOH per gram of product. In addition, especially when (c) and/or (d) are used, the reaction is monitored for the disappearance of OH functionality relative to an internal standard (i.e., the signal of a constant structure that will remain unchanged during the reaction, for example, the carbonyl signal) via infrared spectroscopy. One aspect of the present methods is that the reaction between compounds (a) and (b) is run to completion, i.e. until substantially all of compound (b) is reacted with the aminoplast. The reaction is also run so as to not promote or allow a significant amount (i.e. <5%) of self-condensation of the aminoplast. Thus, the present methods are distinct from many methods described in the art where similar starting materials are used; those methods either promote or otherwise allow self-condensation of the aminoplast, which results in a gelled or partially gelled material, or the reaction is not run to completion, such that reactive groups from the coreactant, such as OH or carboxyl groups, are present in the reaction product. Therefore, the present methods result in the formation of a novel product that is not achieved by other methods taught in the art.

The present invention is also directed to a curable powder coating composition comprising a solid particulate, film-forming mixture of (1) a polymer containing reactive functional groups, and (2) the crosslinking agent described above. The polymer (1) can be selected from a variety of polymers having aminoplast-reactive functional groups well known in the art, so long as the Tg of the polymer is sufficiently high to permit the formation of a stable, solid particulate composition. The Tg of the polymer (1) generally is at least 30° C., often at least 40° C., and typically at least 50° C. The Tg of the polymer (1) also generally is less than 130° C., often less than 100° C., and typically less than 80° C. The Tg of the functional group-containing polymer (1) can range between any combination of these values inclusive of the recited values.

Examples of polymers having reactive functional groups useful in the curable powder coating compositions of the invention include acrylic, polyester, polyurethane, polyepoxide, and polyether polymers. The polymer (1) typically comprises reactive functional groups selected from hydroxyl, epoxy, carboxyl and/or carbamate functional groups, or a combination thereof. In one embodiment of the present invention, the polymer (1) comprises hydroxyl and/or carbamate functional groups. In another embodiment of the invention, the polymer (1) comprises epoxy and/or hydroxyl functional groups. A specific example of a suitable resin is one comprised of a hydroxy functional polyfluorinated material.

The functional group-containing polymer (1) generally is present in the curable powder coating compositions of the invention in an amount ranging from at least 5 percent by weight, often at least 20 percent by weight, typically at least 30 percent by weight, and usually at least 40 percent by weight based on the total weight of the powder coating composition. The functional group-containing polymer (1) also generally is present in the present powder coating compositions in an amount less than 95 percent by weight, often less than 90 percent by weight, typically less than 85 percent by weight, and usually less than 80 percent by weight based on the total weight of the powder coating composition. The amount of the functional group-containing polymer (1) in the powder coating compositions of the present invention can range between any combination of these values inclusive of the recited values.

The powder coating compositions of the present invention further comprise, as component (2), the crosslinking agent described above. The crosslinking agent (2) is generally present in an amount ranging from at least 5 percent by weight, often at least 10 percent by weight, typically at least 15 percent by weight, and usually at least 20 percent by weight based on the total weight of the powder coating composition. The crosslinking agent (2) also generally is present in an amount less than 95 percent by weight, often less than 80 percent by weight, typically less than 70 percent by weight, and usually less than 60 percent by weight based on the total weight of the powder coating composition. The amount of the crosslinking agent (2) present in the powder coating compositions of the present invention can range between any combination of these values inclusive of the recited values.

The components (1) and (2) of the curable powder coating composition may each independently comprise one or more functional species, and are each present in amounts sufficient to provide cured coatings having a desirable combination of physical properties, e.g., smoothness, optical clarity, scratch resistance, solvent resistance and hardness.

As used herein, the term "reactive" refers to a functional group that forms a covalent bond with another functional group under suitable reaction conditions.

As used herein, the term "cure" as used in connection with a composition, e.g., "a curable composition", shall mean that any crosslinkable components of the composition are at least partially crosslinked. In certain embodiments of the present invention, the crosslink density of the crosslinkable components, i.e., the degree of crosslinking, ranges from 5 percent to 100 percent of complete crosslinking. In other embodiments, the crosslink density ranges from 35 percent to 85 percent of full crosslinking. In other embodiments, the crosslink density ranges from 50 percent to 85 percent of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the Tg and crosslink density of free films of coatings or polymers. These physical properties of a cured material are related to the structure of the crosslinked network.

If desired, the powder coating compositions of the present invention can also include an adjuvant curing agent different from the crosslinking agent (2). The adjuvant curing agent can be any compound having functional groups reactive with the functional groups of the polymer (1) or the crosslinking agent (2) described above. Nonlimiting examples of suitable adjuvant curing agents include blocked isocyanates, triazine compounds, conventional aminoplasts, glycoluril resins, and mixtures thereof; the use of these compounds is well known in the art.

A glycoluril resin particularly suitable for use as the adjuvant curing agent is POWDERLINK 1174, commercially available from Cytec Industries, Inc. of Stamford, Conn.

When employed, the adjuvant curing agent generally is present in the powder coating compositions in an amount ranging from 5 to 10 percent by weight, often from 5 to 20 percent by weight, typically from 5 to 30 percent by weight, and usually from 5 to 50 percent by weight based on the total weight of the powder coating composition. When a triazine compound is used, it is typically present in the powder coating composition of the present invention in an amount ranging up to about 20 percent by weight, and usually from about 1 to 20 percent by weight, percent by weight being based on the total weight of the powder coating composition. Mixtures of the adjuvant curing agents can also be used advantageously.

Also, it should be understood that, for purposes of the present invention, the curable powder coating compositions that contain epoxy group-containing polymers typically also include an epoxide-reactive curing (i.e., crosslinking) agent, usually an acid functional curing agent, in addition to the aminoplast-based crosslinking agent (2). A secondary hydroxyl group can be generated upon reaction of each epoxy functional group with a functional group of the epoxide-reactive curing agent. These secondary hydroxyl groups are then available for further reaction with the aminoplast-based crosslinking agent (2). Suitable epoxide-reactive curing agents may have functional groups selected from the group consisting of hydroxyl, thiol, primary amines, secondary amines, acid (e.g. carboxylic acid), and mixtures thereof. Useful epoxide reactive curing agents having amine functionality include, for example, dicyandiamide and substituted dicyandiamides. Preferably, the epoxide reactive curing agent has carboxylic acid groups.

The powder coating compositions of the present invention can further include additives commonly known in the art. Typical additives include benzoin, used to reduce entrapped air or volatiles; flow aids or flow control agents, which aid in the formation of a smooth and/or glossy surface, for example, MODAFLOW available from Monsanto Chemical Co.; waxes such as MICROWAX C available from Hoechst; fillers such as calcium carbonate, barium sulfate and the like; pigments and dyes as colorants; UV light stabilizers such as TINUVIN 123 or TINUVIN 900 available from CIBA Specialty Chemicals and catalysts to promote the various crosslinking reactions. Such additives are typically present in the powder coating compositions of the present invention in an amount ranging from 1 to 60 weight percent based on total weight of the powder coating composition.

The powder coating compositions of the invention can be prepared by any means known in the art, such as by blending the functional group-containing polymer (1) and the crosslinking agent (2) in a Henschel blade blender. The mixture is then usually extruded through a Baker-Perkins twin screw extruder at a temperature ranging from 158° F. to 266° F. (70° C. to 130° C.). The resultant chip is usually ground and classified to an appropriate particle size, typically between 20 and 200 microns, in a cyclone grinder/sifter.

The powder coating compositions of the invention can be applied to a variety of substrates including metallic substrates, for example, aluminum and steel substrates, and non-metallic substrates, for example, thermoplastic or thermoset composite substrates. The powder coating compositions are typically applied by spraying, and in the case of a metal substrate, by electrostatic spraying which is preferred, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

Generally, after application of the powder coating composition, the powder coated substrate is heated to a temperature sufficient to cure the coating, typically to a temperature ranging from 250° F. to 500° F. (121.1° C. to 260.0° C.) for 1 to 60 minutes, and preferably from 300° F. to 400° F. (148.9° C. to 204.4° C.) for 15 to 30 minutes.

The curable powder coating composition can be applied as a primer or primer surfacer, or as a top coat, for example, a "monocoat". In one embodiment, the present invention is directed to a curable powder coating composition that is advantageously employed as a top coat in a multi-layer composite coated substrate or article. Such a multi-layer composite coated substrate of article generally comprises a film-forming base coat, which typically is deposited from a film-forming base coating (typically pigmented) composition, and a top coat applied over the base coat, the top coat being deposited from the curable powder coating composition of the present invention. In a particular embodiment, the multi-component composite coated substrate or article has a color-plus-clear system where the top coat is deposited from a powder coating composition that is substantially pigment-free, i.e., a clear coat.

The film-forming composition from which the base coat is deposited can be any of the compositions useful in coatings applications, for example, in automotive applications where color-plus-clear systems are most often used. A film-forming composition conventionally comprises a resinous binder and often a pigment to serve as a colorant. Particularly useful resinous binders include acrylic polymers, polyesters including alkyds, and polyurethanes.

The resinous binders for the base coat can be organic solvent-based materials, such as those described in U.S. Pat. No. 4,220,679. Water-based coating compositions, such as those described in U.S. Pat. Nos. 4,403,003; 4,147,679; and 5,071,904, can also be used as the base coat composition.

As mentioned above, the base coat compositions also can contain pigments of various types as colorants. Suitable metallic pigments include aluminum flake, bronze flake, copper flake, and the like. Other examples of suitable pigments include mica, iron oxides, lead oxides, carbon black, titanium dioxide, talc, as well as a variety of color pigments.

Optional ingredients for the base coat film-forming compositions include those that are well known in the art of surface coatings and include surfactants, flow control agents, thixotropic agents, fillers, anti-gassing agents, organic co-solvents, catalysts, and other suitable adjuvants.

The base coat film-forming compositions can be applied to the substrate by any of the conventional coating techniques, such as brushing, spraying, dipping or flowing, but they are most often spray-applied. The usual spray techniques and equipment for air spraying, airless spraying and electrostatic spraying can be used.

The base coat film-forming compositions are typically applied to the substrate so that a cured base coat will have a dry film thickness ranging from 0.5 to 4 mils (12.5 to 100 micrometers). After forming a film of the base coat on the substrate, the base coat can be cured or alternatively given a drying step in which solvent, i.e., organic solvent and/or water, is driven off by heating or an air drying step before application of the clear coat. Suitable drying conditions will depend on the particular base coat film-forming composition and on the ambient humidity with certain water-based compositions. In general, a drying time ranging from 1 to 15 minutes at a temperature of 75° F. to 200° F. (21° C. to 93° C.) is adequate.

The curable powder top coating composition can be applied over at least a portion of the base coat by any of the methods of application described above. The curable powder top coating composition can be applied to a cured base coat or a dried but uncured base coat. In the latter case, the top coat and the base coat are cured simultaneously.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

Into a two-liter four-necked reaction kettle equipped with a thermometer, a mechanical stirrer, a nitrogen inlet, and means for removing the by-product (methanol) were placed 640.0 parts by weight of (methoxymethyl)melamine-formaldehyde resin (CYMEL 303 from Cytec Industries, Inc.), 488.0 parts by weight of benzoic acid, and 1.00 part by weight of p-toluenesulfonic acid. The mixture was heated to 135° C. and the temperature was maintained while the methanol by-product was removed from the system. The reaction progress was monitored by measuring the IR spectra and acid value of the mixture and was terminated when the end point was detected. The end product was free of any hydroxyl groups as shown by the IR spectrum and its acid number was less than about 15. The product thus obtained was a pale yellow solid with a softening temperature of around 29° C.

Example 2

Into a two-liter four-necked reaction kettle equipped with a thermometer, a mechanical stirrer, a nitrogen inlet, and means for removing the by-product (methanol) were placed 640.0 parts by weight of CYMEL 303, 610.0 parts by weight of benzoic acid, and 1.20 part by weight of p-toluenesulfonic acid. The mixture was heated to 135° C. and the temperature was maintained while the methanol by-product was removed from the system. The reaction progress was monitored by measuring the IR spectra and acid value of the mixture and was terminated when the end point was detected. The end product was free of any hydroxyl groups as shown by the IR spectrum and its acid number was less than about 15. The product thus obtained was a pale yellow solid with a softening temperature of around 30° C.

Example 3

Into a two-liter four-necked reaction kettle equipped with a thermometer, a mechanical stirrer, a nitrogen inlet, and means for removing the by-product (methanol) were placed 640.0 parts by weight of CYMEL 303, 488.0 parts by weight of benzoic acid, 95.4 parts by weight of benzoin, and 1.00 part by weight of p-toluenesulfonic acid. The mixture was heated to 135° C. and the temperature was maintained while the methanol by-product was removed from the system. The reaction progress was monitored by measuring the IR spectra and acid value of the mixture and was terminated when the end point was detected. The end product was free of any hydroxyl groups as shown by the IR spectrum and its acid number was less than about 15. The product thus obtained was a pale yellow solid with a softening temperature of around 38° C.

Example 4

Into a two-liter four-necked reaction kettle equipped with a thermometer, a mechanical stirrer, a nitrogen inlet, and means for removing the by-product (methanol) were placed 640.0 parts by weight of CYMEL 303, 712.0 parts by weight of 4-tert-butylbenzoic acid, 95.4 parts by weight of benzoin, and 1.10 part by weight of p-toluenesulfonic acid. The mixture was heated to 135° C. and the temperature was maintained while the methanol by-product was removed from the system. The reaction progress was monitored by measuring the IR spectra and acid value of the mixture and was terminated when the end point was detected. The end product was free of any hydroxyl groups as shown by the IR spectrum and its acid number was less than about 15. The product thus obtained was a pale yellow solid with a softening temperature of around 46° C.

Example 5

Into a two-liter four-necked reaction kettle equipped with a thermometer, a mechanical stirrer, a nitrogen inlet, and means for removing the by-product (methanol) were placed 640.0 parts by weight of CYMEL 303, 544.6 parts by weight of p-toluic acid, and 1.00 part by weight of p-toluenesulfonic acid. The mixture was heated to 135° C. and the temperature was maintained while the methanol by-product was removed from the system. The reaction progress was monitored by measuring the IR spectra and acid value of the mixture and was terminated when the end point was detected. The end product was free of any hydroxyl groups as shown by the IR spectrum and its acid number was less than about 15. The product thus obtained was a pale yellow solid with a softening temperature of around 42° C.

Example 6

Into a two-liter four-necked reaction kettle equipped with a thermometer, a mechanical stirrer, a nitrogen inlet, and means for removing the by-product (methanol) were placed 640.0 parts by weight of CYMEL 303, 608.0 parts by weight of p-anisic acid, and 1.00 part by weight of p-toluenesulfonic acid. The mixture was heated to 135° C. and the temperature was maintained while the methanol by-product was removed from the system. The reaction progress was monitored by measuring the IR spectra and acid value of the mixture and was terminated when the end point was detected. The end product was free of any hydroxyl groups as shown by the IR spectrum and its acid number was less than about 15. The product thus obtained was a pale yellow solid with a softening temperature of around 40° C.

Example 7

Into a two-liter four-necked reaction kettle equipped with a thermometer, a mechanical stirrer, a nitrogen inlet, and means for removing the by-product (methanol) were placed 540.5 parts by weight of CYMEL 303, 500.0 parts by weight of trans-cinnamic acid, and 0.90 part by weight of p-toluenesulfonic acid. The mixture was heated to 135° C. and the temperature was maintained while the methanol by-product was removed from the system. The reaction progress was monitored by measuring the IR spectra and acid value of the mixture and was terminated when the end point was detected. The end product was free of any hydroxyl groups as shown by the IR spectrum and its acid number was less than about 15. The product thus obtained was a pale yellow solid.

Example 8

Samples 1 to 5 were prepared using the ingredients and amounts (in grams) shown in Table 1. The samples were prepared as follows. The ingredients were weighed together and processed for ~20s in a Prism blender at 3500 rpm's.

This premix was then extruded through a b&p Process Equipment and Systems 19 mm co-rotating twin screw extruder at 450 rpm's at temperatures ranging from 100° C. to 115° C. The resultant chip was milled and classified to a median particle size of 30 to 50 μm on a Hosokawa Micron Powder Systems Air Classifying Mill I. The formulas were then electrostatically sprayed using Nordson equipment onto cold rolled steel panels supplied by ACT Laboratories as B-1000 P60 DIW, nonpolished panels. Finally, the panels were baked in electric Despatch LAD series ovens over a 25 minute dwell time. Samples 1 and 2 were baked for 25 minutes at 385° F. and Samples 3–5 for 25 minutes at 375° F. All testing was run at a dry film thickness of 2.0 to 3.0 mils.

TABLE 1

| Material | Sample 1 | Sample 2 | Sample 3 | Sample 4 | Sample 5 |
|---|---|---|---|---|---|
| CRYLCOAT 290[1] | 390.0 | 370.0 | 370.0 | 370.0 | 370.0 |
| EPON[2] | — | 2.0 | — | — | — |
| CYMEL 303 | 25.0 | — | — | — | — |
| Product from Example 1 | — | 45.0 | — | — | — |
| Product from Example 3 | — | — | 45.0 | — | — |
| Product from Example 4 | — | — | — | 45.0 | — |
| Product from Example 7 | — | — | — | — | 45.0 |
| Di-p-tolylsulfonimide | 1.00 | 0.50 | 0.80 | 0.80 | 0.80 |
| 2,2,6,6-tetramethylpiperidinol | 0.40 | 0.50 | 0.40 | 0.40 | 0.40 |
| Benzoin | 3.0 | 3.0 | 3.0 | 3.0 | 3.0 |
| RESIFLOW PL-200[3] | 6.0 | 6.0 | 6.0 | 6.0 | 6.0 |
| LICOWAX[4] | 3.0 | 3.0 | 3.0 | 3.0 | 3.0 |
| POWDERMATE 542 DG[5] | 3.0 | 3.0 | 3.0 | 3.0 | 3.0 |
| $TiO_2$ R706 | 235.0 | 200.0 | 235.0 | 235.0 | 235.0 |
| Powder Stability 1 day @ 40° C.[6] | Fused | Excellent | Slightly cakey | Slightly cakey | Slightly cakey |
| Powder Stability 7 day @ 40° C. | Sintered | Clumpy | Sintered | Clumpy | Clumpy |
| Impact (direct/reverse) (in-lbs)[7] | 40/50 | 160/160 | 140/160 | 120/160 | 160/160 |
| MEK (50 double rubs)[8] | 2 | 1 | 4 | 5 | 3 |
| Off-gassing bake temp and thickness (mils)[9] | 385° F. <2 | 385° F. 7.5–7.7 | 375° F. 5.8 | 375° F. 6.2–6.8 | 375° F. 5.9–6.8 |

[1]Standard durable 30 OH functional polyester, from UCB Chemicals.
[2]Bisphenol A based epoxy resin, from Resolution Performance Products.
[3]Acrylic flow additive dispersed on silica, from Estron Chemical.
[4]Ethylene bis(stearamide), from Clariant Additives.
[5]Proprietary degassing agent, from Troy Corporation.
[6]Powder stability was tested by filling a 2 oz. glass jar half full of powder, sealing it, and placing it into a controlled temperature water bath at the designated temperature for a specified amount of time. At the completion of the testing,the sample was allowed to rest outside of the bath for 30 minutes. The jar was then rapped upside down on a hard surface 2 to 3 times and the condition of the powder was rated as follows: Excellent > Good ≥ Slightly Cakey > Cakey >Slight Clumpy > Clumpy > Fused > Sintered.
[7]Impact testing was run according to ASTM D 2794 using a Byk-Gardner Falling Dart Impact tester.
[8]MEK resistance was run by rubbing a Q-tip soaked with methyl ethyl ketone back and forth across a panel (one double rub) 50 times and then rating the resulting marks as follows: MEK rating system:  0 No change  1 Slight gloss loss around test area  2 Barely detectable gloss loss in test area  3 Barely detectable scuffing of test area  4 Slightly detectible scuffing of test area  5 Noticeable scuffing of test area  6 Marring of test area  7 Smearing of test area   Readings of 0–5 are generally regarded as acceptable.
[9]Off-gassing was tested by spraying a panel so that the coating increased in thickness from top to bottom. The panel was baked at the temperature for 25 minutes and the film thickness where pinholes and/or blisters began was recorded in mils.The higher the number, the more tolerant the coating is to off-gassing.

As can be seen from the results of Table 1, the samples of the present invention, Samples 2–5, gave overall better results than the control, Sample 1. Impact and tolerance to off-gassing were markedly better.

Whereas particular embodiments of this invention have been described above for purposes of illustration, it will be evident to those skilled in the art that numerous variations of the details of the present invention may be made without departing from the invention as defined in the appended claims.

We claim:

1. A curable powder coating composition comprising a solid particulate film-forming mixture of the following components:
   (1) a polymer containing reactive functional groups, said polymer having a glass transition temperature of at least 30° C.; and
   (2) a crosslinking agent comprising an ungelled reaction product of the following reactants:
      (a) an aminoplast resin; and
      (b) a monofunctional carboxylic acid compound having a single carboxyl group as the sole active hydrogen-containing group in said compound;
   wherein the crosslinking agent has a glass transition temperature of at least 10° C. and is substantially free of active hydrogen-containing groups.

2. The curable powder coating composition of claim 1, wherein the polymer (1) is selected from the group consisting of acrylic polymers, polyester polymers, polyurethane polymers, polyepoxide polymers, polyether polymers, and mixtures thereof.

3. The curable powder coating composition of claim 2, wherein the polymer is a polyepoxide, and the composition further comprises an acid functional component that is reactive with the epoxide.

4. A substrate coated with the powder coating composition of claim 1.

5. A coated substrate comprising:
   (a) a basecoat deposited on the substrate from a film-forming base coating composition; and
   (b) a topcoat deposited over at least a portion of the basecoat from a film-forming topcoating composition,
   wherein the topcoating composition comprises the powder coating of claim 1.

6. A curable powder coating composition comprising a solid particulate film-forming mixture of the following components:
   (1) a polymer containing reactive functional groups, said polymer having a glass transition temperature of at least 30° C.; and
   (2) a crosslinking agent consisting of an ungelled reaction product of the following reactants:
      (a) an aminoplast resin; and
      (b) a monofunctional carboxylic acid-containing compound; wherein the crosslinking agent has a glass transition temperature of at least 10° and is substantially free of active hydrogen-containing groups.

7. The curable powder coating composition of claim 6, wherein the polymer (1) is selected from the group consisting of acrylic polymers, polyester polymers, polyurethane polymers, polyepoxide polymers, polyether polymers, and mixtures thereof.

8. The curable powder coating composition of claim 7, wherein the polymer is a polyepoxide, and the composition further comprises an acid functional component that is reactive with the epoxide.

9. A substrate coated with the powder coating composition of claim 6.

10. A coated substrate comprising:
    (a) a basecoat deposited on the substrate from a film-forming base coating composition; and
    (b) a topcoat deposited over at least a portion of the basecoat from a film-forming topcoating composition,
    wherein the topcoating composition comprises the powder coating of claim 6.

11. A crosslinking agent, comprising an ungelled reaction product of the following reactants:
    (a) an aminoplast resin that comprises an alkoxylated aldehyde condensate of glycoluril; and
    (b) a monofunctional carboxylic acid compound having a single carboxyl group as the sole active hydrogen-containing group in said compound;
    wherein the crosslinking agent has a glass transition temperature of at least 10° C. and is substantially free of active hydrogen-containing groups.

12. The crosslinking agent of claim 11, wherein the alkoxylated aldehyde condensate of glycoluril comprises tetramethoxy methylglycoluril.

13. A crosslinking agent consisting of an ungelled reaction product of
    (a) an aminoplast resin that comprises an alkoxylated aldehyde condensate of glycoluril; and
    (b) a monofunctional carboxylic acid-containing compound; wherein the crosslinking agent has a glass transition temperature of at least 10° C. and is substantially free of active hydrogen-containing groups.

14. The crosslinking agent of claim 13, wherein the alkoxylated aldehyde condensate of glycoluril comprises tetramethoxy methylglycoluril.

15. A crosslinking agent comprising an ungelled reaction product of the following reactants:
    (a) an aminoplast resin and
    (b) 4-tert-butyl benzoic acid;
    wherein the crosslinking agent has a glass transition temperature of at least 10° C. and is substantially free of active hydrogen-containing groups.

16. A crosslinking agent comprising an ungelled reaction product of the following reactants:
    (a) an aminoplast resin and
    (b) phenylacetic acid or a derivative thereof;
    wherein the crosslinking agent has a glass transition temperature of at least 10° C. and is substantially free of active hydrogen-containing groups.

17. A crosslinking agent comprising an ungelled reaction product of the following reactants:
    (a) an aminoplast resin and
    (b) p-toluic acid;
    wherein the crosslinking agent has a glass transition temperature of at least 10° C. and is substantially free of active hydrogen-containing groups.

18. A crosslinking agent comprising an ungelled reaction product of the following reactants:
    (a) an aminoplast resin and
    (b) p-anisic acid;
    wherein the crosslinking agent has a glass transition temperature of at least 10° C. and is substantially free of active hydrogen-containing groups.

19. A crosslinking agent comprising an ungelled reaction product of the following reactants:
    (a) an aminoplast resin and
    (b) trans-cinnamic acid;
    wherein the crosslinking agent has a glass transition temperature of at least 10° C. and is substantially free of active hydrogen-containing groups.

20. A crosslinking agent comprising an ungelled reaction product of the following reactants:
    (a) an aminoplast resin; and
    (b) a monofunctional carboxylic acid-containing compound; wherein component (b) further comprises a polyfunctional carboxylic acid,
    wherein the crosslinking agent has a glass transition temperature of at least 10° C. and is substantially free of active hydrogen-containing groups, and wherein the weight percent of polyfunctional acid is $\leq 20$, with weight percent being based on the total weight of component (b).

21. The crosslinking agent of claim 20, wherein the polyfunctional carboxylic acid is selected from the group consisting of phthalic acid, terephthalic acid, and trimellitic acid.

22. A crosslinking agent, comprising an ungelled reaction product of the following reactants:
    (a) an aminoplast resin;
    (b) a monofunctional carboxylic acid compound having a single carboxyl group as the sole active hydrogen-containing group in said compound;
    (c) a mono-hydroxy aromatic compound having structure (I):

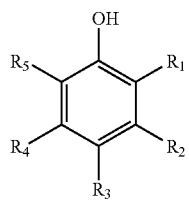

wherein each of $R_1$ through $R_5$ are the same or different and are selected from H, a monovalent hydrocarbon group, $COOR_6$ where $R_6$ is H or a monovalent hydrocarbon group, $NO_2$, halogen or $XR_7$, where X is oxygen or sulfur and $R_7$ is a monovalent hydrocarbon group having 1 to 8 carbon atoms;

wherein the crosslinking agent has a glass transition temperature of at least 10° C. and is substantially free of active hydrogen-containing groups.

23. The crosslinking agent of claim 22, wherein (c) is t-butyl phenol.

24. A crosslinking agent, comprising an ungelled reaction product of the following reactants:
(a) an aminoplast resin;
(b) a monofunctional carboxylic acid compound having a single carboxyl group as the sole active hydrogen-containing group in said compound;
(d) compounds having the following structure (II):

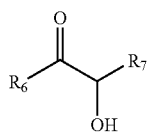

or dimer derivatives thereof, where $R_6$ and $R_7$ are the same or different and each independently represents an aromatic group or an alkyl group having 1 to 12 carbon atoms;

wherein the crosslinking agent has a glass transition temperature of at least 10° C. and is substantially free of active hydrogen-containing groups.

25. The crosslinking agent of claim 24, wherein (d) is benzoin.

26. A method for converting a liquid aminoplast into an ungelled crosslinking agent comprising:
(a) mixing together:
(i) an aminoplast resin; and
(ii) a monofunctional carboxylic acid-containing compound;
(b) heating the admixture of step (a) to a temperature ranging from 90° C. to 160° C.; and
(c) maintaining the temperature achieved in step (b) for a time sufficient to obtain an ungelled reaction product that has a glass transition temperature of at least 10° C. and that is substantially free of active hydrogen-containing groups,
wherein the aminoplast resin comprises a (methoxymethyl) aminotriazine compound, and wherein the monofunctional carboxylic acid-containing compound is 4-tert-butyl benzoic acid.

27. A method for converting a liquid aminoplast into an ungelled crosslinking agent comprising:
(a) mixing together:
(i) an aminoplast resin; and
(ii) a monofunctional carboxylic acid-containing compound;
(b) heating the admixture of step (a) to a temperature ranging from 90° C. to 160° C.; and
(c) maintaining the temperature achieved in step (b) for a time sufficient to obtain an ungelled reaction product that has a glass transition temperature of at least 10° C. and that is substantially free of active hydrogen-containing groups,
wherein the aminoplast resin comprises a (methoxymethyl) aminotriazine compound, and wherein the monofunctional carboxylic acid containing compound is p-toluic acid.

* * * * *